United States Patent
Nicklas

(10) Patent No.: US 12,384,501 B2
(45) Date of Patent: Aug. 12, 2025

(54) PROPULSION SYSTEM FOR A SEAGOING VESSEL

(71) Applicant: John Matthew Nicklas, Ann Arbor, MI (US)

(72) Inventor: John Matthew Nicklas, Ann Arbor, MI (US)

(73) Assignee: John Matthew Nicklas, Ann Arbor, MI (US)

( * ) Notice: Subject to any disclaimer, the term of this patent is extended or adjusted under 35 U.S.C. 154(b) by 377 days.

(21) Appl. No.: 17/961,090

(22) Filed: Oct. 6, 2022

(65) Prior Publication Data

US 2023/0105674 A1    Apr. 6, 2023

Related U.S. Application Data

(60) Provisional application No. 63/252,789, filed on Oct. 6, 2021.

(51) Int. Cl.
| | |
|---|---|
| *B63H 9/061* | (2020.01) |
| *B63B 79/15* | (2020.01) |
| *B63B 79/40* | (2020.01) |
| *B63H 1/14* | (2006.01) |
| *B63H 13/00* | (2006.01) |
| *F03D 3/00* | (2006.01) |
| *F03D 9/25* | (2016.01) |
| *F03D 9/32* | (2016.01) |

(52) U.S. Cl.
CPC .......... *B63H 9/0628* (2020.02); *B63B 79/15* (2020.01); *B63B 79/40* (2020.01); *B63H 1/14* (2013.01); *B63H 13/00* (2013.01); *F03D 3/005* (2013.01); *F03D 9/25* (2016.05); *F03D 9/32* (2016.05); *F05B 2240/931* (2013.01)

(58) Field of Classification Search
CPC .......... B63H 9/06; B63H 9/0628; B63H 9/08; B63H 9/32; B63H 13/00; F03D 3/066
See application file for complete search history.

(56) References Cited

U.S. PATENT DOCUMENTS

| | | | |
|---|---|---|---|
| 6,902,447 B1 * | 6/2005 | Pittman | B63H 13/00 440/8 |
| 8,206,106 B2 * | 6/2012 | Syrovy | F03D 1/02 416/83 |
| 9,752,557 B2 | 9/2017 | Nicklas | |
| 2005/0025624 A1 * | 2/2005 | Pierson | F03D 13/20 416/197 A |
| 2006/0151664 A1 * | 7/2006 | Yu | B64C 39/008 244/4 R |

* cited by examiner

*Primary Examiner* — Courtney D Heinle
*Assistant Examiner* — Danielle M. Christensen
(74) *Attorney, Agent, or Firm* — Darrow Mustafa PC

(57) ABSTRACT

A propulsion system for a seagoing vessel includes a rotatable frame and either (a) at least two masts coupled to the frame and each having a sail and a boom, or (b) at least two blades coupled to the frame. The rotatable frame and either the rotatable boom or at least two blades may be locked in position in a locked mode and unlocked and freely rotatable in an unlocked mode. A control system that is in communication in communication with a frame lock and either a boom lock or a blade lock and may be configured to determine when the vertical axis wind turbine should be in either the locked mode or the unlocked mode based on the direction of the wind and a direction that the seagoing vessel is traveling.

11 Claims, 10 Drawing Sheets

PROPULSION SYSTEM FOR A SEAGOING VESSEL

CROSS-REFERENCE TO RELATED APPLICATION

This application claims priority to U.S. Provisional Patent Application Ser. No. 63/252,789 filed on Oct. 6, 2021, the entire contents of which are hereby incorporated by reference in its entirety.

TECHNICAL FIELD

The subject matter described herein relates, in general, to propulsion systems for seagoing vessels.

BACKGROUND

The background description provided is to present the context of the disclosure generally. Work of the inventor, to the extent it may be described in this background section, and aspects of the description that may not otherwise qualify as prior art at the time of filing are neither expressly nor impliedly admitted as prior art against the present technology.

Seagoing vessels may utilize a number of different propulsion systems for propelling the seagoing vessel through a body of water. For example, some seagoing vessels utilize one or more sails attached to a mast. The sail functions to capture the wind and transfer the forces from the wind to the mast of the seagoing vessel, which then propels the seagoing vessel. Using sails to capture wind to propel the seagoing vessel has certain advantages, namely, the ability to propel the seagoing vessel without the need for complex machinery that requires fuel. However, using wind to propel a seagoing vessel also has drawbacks, as the propulsion of the seagoing vessel is based on the direction and speed of the wind. If the speed and direction of the wind is unfavorable, the propulsion of the seagoing vessel may be significantly impacted.

In another example, some seagoing vessels utilize one or more propellers in mechanical communication with a machine, such as an engine, which can rotate the propeller. A propeller is a device with a rotating hub and radiating blades set at a pitch to form a helical spiral that, when rotated, acts similar to Archimedes' screw. It transforms rotational power into linear thrust by acting upon a working fluid such as water or air. However, unlike sails, the propeller must be driven by a machine, which requires fuel. The machine may be in the form of an engine that utilizes gasoline, diesel fuel, and the like. In other examples, the machine may be a nuclear power plant that generates steam that turns a turbine that turns one or more propellers.

SUMMARY

This section generally summarizes the disclosure and is not a comprehensive explanation of its full scope or all its features.

A propulsion system for a seagoing vessel includes a vertical axis wind turbine having a locked mode and an unlocked mode. The vertical axis wind turbine may have a frame having a frame lock. The frame is freely rotatable about a central axis in the unlocked mode and non-rotatable about the central axis in the locked mode. The frame may also include either (a) at least two masts coupled to the frame and each having a sail or (b) at least two blades coupled to the frame. The at least two masts may include at least one boom having an axis of rotation defined by one of the at least two masts that are rotatable about the axis of rotation defined by one of the at least two masts when in the unlocked mode and non-rotatable about the axis defined by one of the at least two masts when in a locked mode. The at least two blades may be rotatable about axes of rotation substantially perpendicular to the central axis when in the unlocked mode and non-rotatable about the axes of rotation substantially perpendicular to the central axis when in the locked mode.

The propulsion system also includes a control system that is in communication in communication with a frame lock and either a boom lock or a blade lock. The control system is configured to lock the frame lock, and either the boom lock or the blade lock when in the locked mode and unlock the frame lock and either the boom lock or the blade lock when in the unlocked mode. The control system may be configured to determine when the vertical axis wind turbine should be in either the locked mode or the unlocked mode based on the direction of the wind and the direction that the seagoing vessel is traveling Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A propulsion system for a seagoing vessel includes at least one vertical axis wind turbine that operates in either a locked mode or an unlocked mode. Moreover, the vertical axis wind turbine may include a frame that is rotatable about a central axis. Attached to the frame may be either masts, each having a boom and a sail or blades. The booms are rotatable about the axes defined by the masts, and the blades are rotatable about an axis substantially perpendicular to the central axis.

In the unlocked mode, the frame and either the booms or the blades are freely rotatable. When the wind interacts with the vertical axis wind turbine, the wind causes the frame to turn. The turning of the frame can then be used to provide power to a propulsion system, either directly or indirectly, via either a mechanical or an electrical system. The unlocked mode may be used in situations where the direction of the wind is not substantially similar to the direction that the seagoing vessel wishes to travel.

In the unlocked mode, the frame and either the booms or the blades are locked into place and are not freely rotatable. In this situation, the wind that interacts with the sails or the blades provides propulsion to the seagoing vessel in a more traditional manner, similar to a sailboat. It has been observed that if the direction of the wind in the direction that the seagoing vessel wishes to travel are similar, it is more efficient to utilize the vertical axis wind turbine in a locked position, wherein the sails or blades of the vertical axis wind turbine capture the wind and propel the seagoing vessel by transferring force through the mast or blades of the vertical axis wind turbine.

Figure 1:
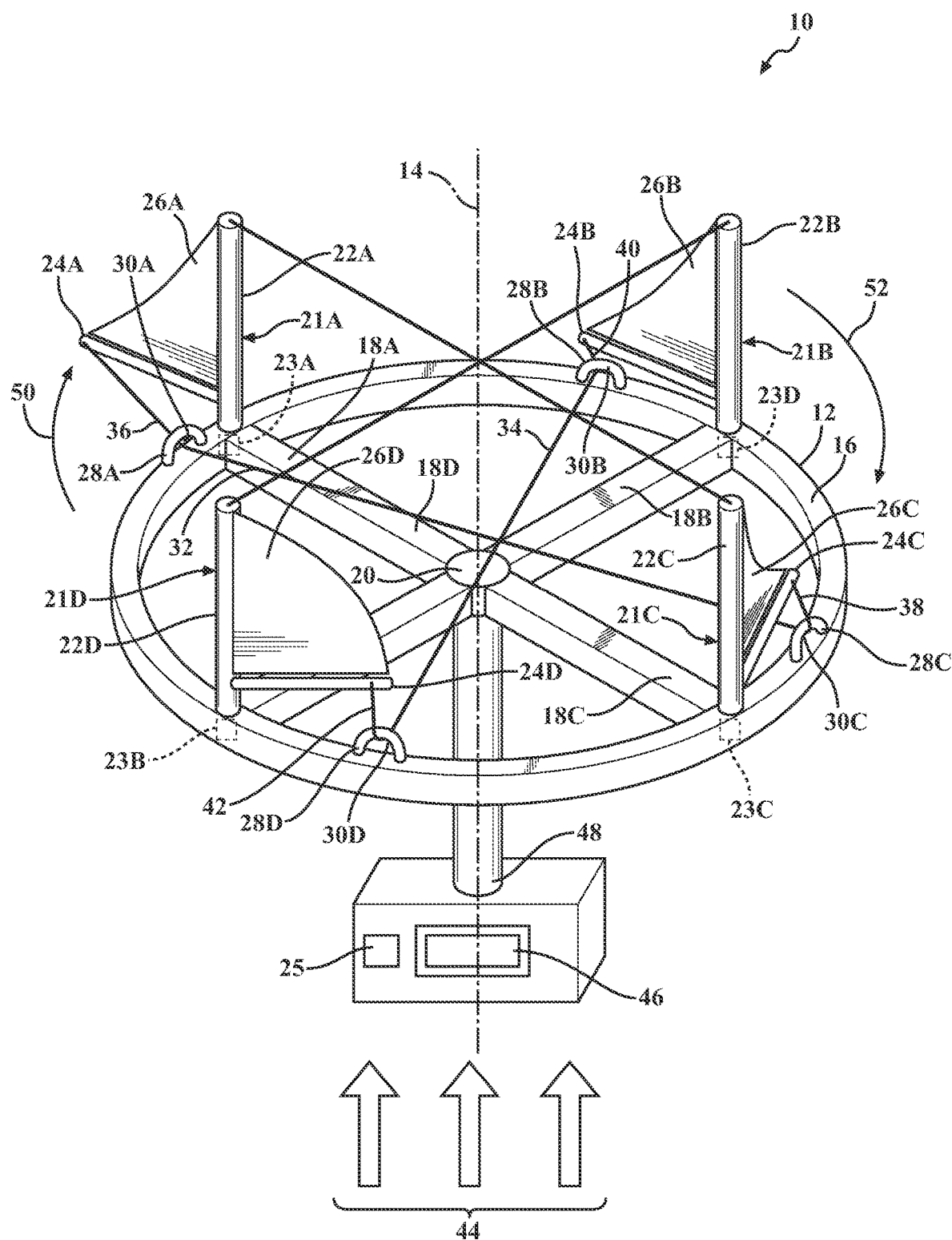
FIG. 1 illustrates a vertical axis turbine for providing propulsion for a seagoing vessel.

Referring to FIG. 1, a vertical axis turbine 10 for providing propulsion for a seagoing vessel is shown. The vertical axis turbine 10 may be similar to any of the vertical axis turbines described in U.S. Pat. No. 9,752,557 entitled "Vertical Axis Turbine," which is hereby incorporated by reference in its entirety. The vertical axis turbine 10 includes a frame 12 rotatable about a central axis 14. The frame may take any one of a number of suitable shapes or be made from any number of suitable materials, such as steel, aluminum, plastic, ceramic, metal alloys, and the like.

Here, the frame 12 includes a substantially circular portion 16. Within this substantially circular portion 16 are spokes 18A-18D. The spokes converge from the substantially circular portion 16 to a central portion 20 located proximate to the central axis 14. Any one of a number of different spokes may be utilized, so long as the spokes can support the frame 12 and later described components.

Additionally, other types of variations can be considered as well. For example, the central rotational axis 14 may be a central vertical shaft rather than a hub 20 and may be attached to the individual masts 22A-22D via a network of reinforcing girders in place of the cables attaching the tops of the individual masts 22A-22D. For instance, one set of girders may span from near the base of this vertical shaft 20 to the tops of the masts 22A-22D, a second from an upper segment of the vertical shaft to the tops of the masts, a third between the tops of the masts\ and optionally a fourth from frame 12 to a short distance up the central vertical shaft to resist deflection of this central vertical shaft. More girders may attach this network to anchoring points on the larger container ship far above the waterline. The vertical shaft described in this paragraph may house one or more additional horizontal axis wind turbines on its top. These vertical and horizontal axis wind turbines might rotate at different frequencies, transmitting power to the propellers by concentric shafts or electrical wires.

The vertical axis turbine 10 also includes wind capturing devices 21A-21D for capturing wind energy. It should be understood that the wind capturing device 21A-21D can be utilized to capture the movement of any liquid or gas medium, not just wind. For example, the wind-capturing device 21A-21D could be used to capture the movement of water or other fluids. The devices 21A-21D may be blades or may be a mast and sail system. The blade may be essentially a mast, sail, and or boom that is one unitary and generally rigid structure. Therefore, it should be understood that any description of masts, sails and/or booms are equally applicable to a blade.

As the wind 44 interacts with the wind capturing devices 21A-21D, the frame 12 may rotate, as indicated by arrows 50 and 52, which can then be used to provide power through either a mechanical connection to a propeller of the seagoing vessel and/or via an electrical connection, such as a generator. The vertical axis turbine 10 may also include a lock 25 that, when in a locked mode, prevents the frame 12 from rotating and, when in an unlocked mode, allows the frame 12 to rotate freely.

The lock 25 can be any type of device capable of selectively preventing the rotation of the frame 12. In some examples, the lock 25 can be one or more pins that are selectively extended through the base 48 such that the rotation of the frame 12 is prevented when the pin is selected through a portion of the masts base 48. Other types of locks can also be used, such as frictional locks that frictionally engage sidewalls of the base 48 preventing the rotation of the frame 12. Further still, the lock 25 can be one or more electric motors that can be energized to allow or prevent the rotation of frame 12.

In this example, the device 21A-21D may have masts. Generally, these masts define a length that is substantially perpendicular to a plane defined by the frame 12. In this embodiment, each mast has a generally opposing mast. More specifically, mast 22A generally opposes mast 22C across the central axis 14. In like manner, mast 22B is generally opposing mast 22D across the central axis 14 as well. As stated before, any even number of masts can be used, so long as each mast has a generally opposing mast.

Attached to each of the masts 22A-22D are booms 24A-24D. These booms generally extend substantially perpendicular to the length defined by the masts 22A-22D. Furthermore, these booms are generally rotatable about an axis generally defined by each of the masts 22A-22D. Sails 26A-26D are attached to both their respective masts 22A-22D and their respective booms 24A-24D. The sails 26A-26D may be made of a cloth-like and flexible material or may be made of a semi-rigid material. There may also be an additional portion of the sails 26A-26D below the booms 24A and attaching to the masts 22A.

The device 21A-21D may also include locks 23A-23D that function to lock the booms 24A-24D into place. By so doing, the booms 24A-24D cannot rotate freely when the vertical axis turbine 10 is in a locked mode. Conversely, when the vertical axis turbine 10 is in an unlocked mode, the locks 23A-23D are unlocked and therefore allow the booms 24A-24D to rotate freely.

The locks 23A-23D can be any type of device capable of selectively preventing the rotation of the booms 24A-24D. In some examples, the locks 23A-23D can be one or more pins that are selectively extended through the masts 22A-

22D such that the rotation of the booms 24A-24D is prevented when the pin is selected through a portion of the masts 22A-22D. Other types of locks can also be used, such as frictional locks that frictionally engage sidewalls of the masts 22A-22D, preventing the rotation of the masts 22A-22D and, therefore, movement of the booms 24A-24D. Further still, the locks 23A-23D can be one or more electric motors that can be energized such that they can allow or prevent the rotation of the masts 22A-22D and, therefore, movement of the booms 24A-24D.

Alternatively, as mentioned above, the devices 21A-21D may be blades. As such, the devices 21A-21D may only include masts 22A-22D and sails 26A-26D that form a unitary blade. Generally, this blade is rigid but may also be made out of a semi-rigid or bendable material. An example of a blade will be given later in this description. There may also be an additional portion of the blades below the booms 24A and attaching to the masts 22A.

Attached to the frame are retaining members in the form of eyelets 28A-28D. Generally, the eyelets are located proximate to the mast 22A-22D. Each of the eyelets 28A-28D are located with respect to the masts 22A-22D such that the distance between each of the masts 22A-22D and the corresponding eyelets 28A-28D are substantially similar in both distance and orientation. Each of the eyelets defines an opening 30A-30D. The eyelets 28A-28D may be any suitable shape, but here they are shown as substantially semicircular, with both ends of the semicircular structure attached to the frame 12. While the retaining members are shown in this example to be eyelets 28A-28D, other forms of retaining members may be used instead of or in combination, such as hooks.

The vertical axis turbine 10 also includes a first cord 32 and a second cord 34. The first cord 32 has ends 36 and 38. The first end 36 is attached to boom 24A. The second end 38 of the cord 32 is attached to the boom 24C. The cord 32 extends from boom 24A through the opening 30A of the eyelet 28A and across the central axis 14. From there, the cord 32 extends through the opening 30C of the eyelet 28C and is attached to the boom 24C.

Similarly, the second cord 34 has a first end 40 and a second end 42. The first end 40 is attached to the boom 24B and extends through the opening 30B of the eyelet 28B and generally across the central axis 14. From there, the cord 34 extends through the opening 30B, wherein the second end 42 is attached to the boom 24D.

The cords 32 and 24 can be made of any one of a number of different materials, such as rope, string, or wire. The cords 32 and 34 can also be made out of synthetic materials, such as plastic. The cords 32 and 34 may also be configured to lengthen or detach from the booms 24A-24D or blades when tension exceeds a predetermined threshold.

It is also important to note that the length of the cords 32 and 34 is critical. More specifically, when a wind 44 is directed towards the vertical axis turbine 10, the sails 26A-26D will move to the appropriate orientation based on the movement and length of the cords 32 and 34 to capture this energy generated by the wind 44. As the sails 26A-26D capture this wind, the frame 12 rotates about the central axis 14. A generator 46 located near a base 48 of the vertical axis turbine converts this movement into electricity. As shown in this embodiment, the vertical axis wind turbine would rotate in a clockwise direction, indicated by arrows 50 and 52.

Figure 2:
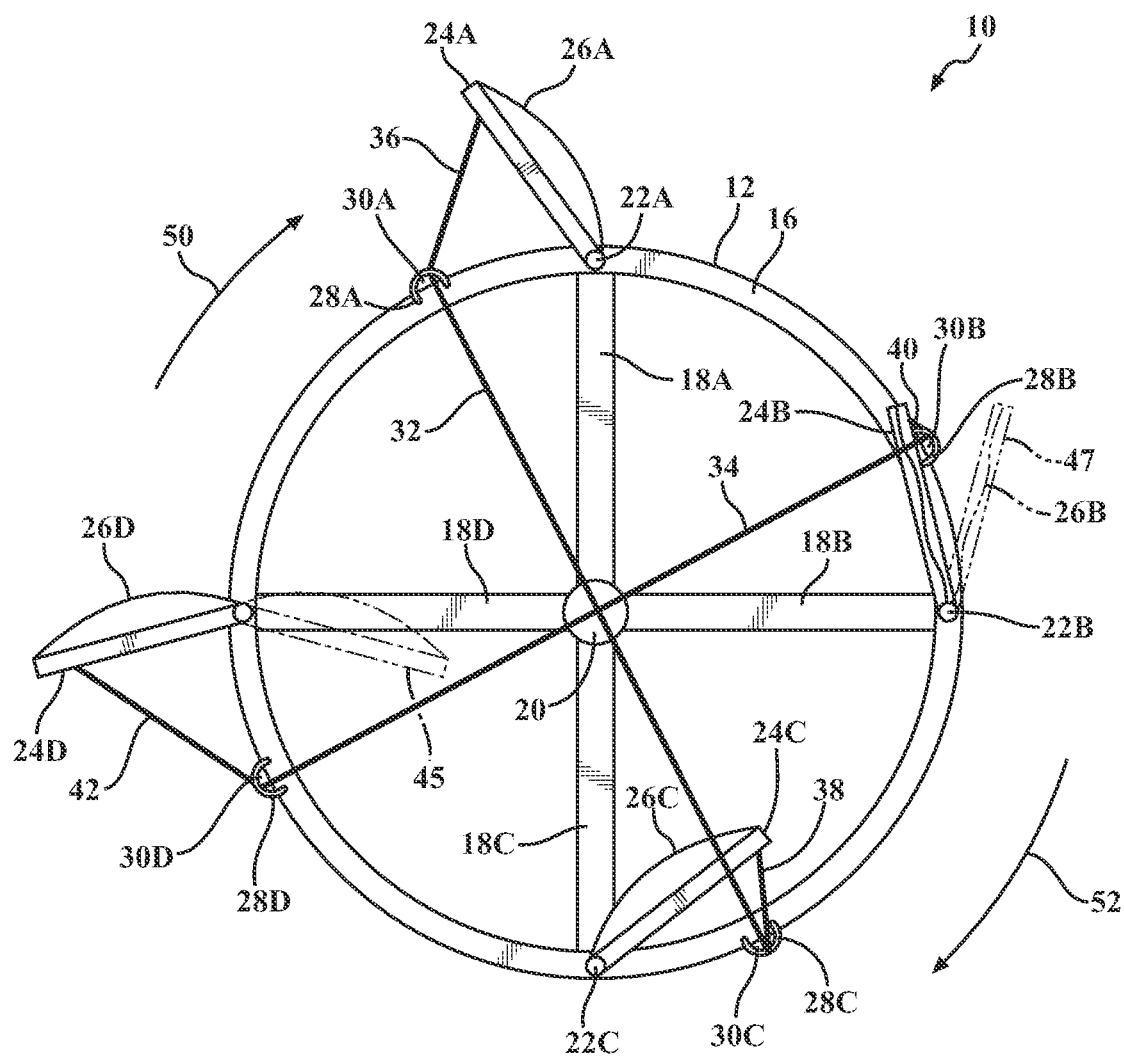
FIG. 2 illustrates a top view of the vertical axis turbine of FIG. 1.
Figure 2:
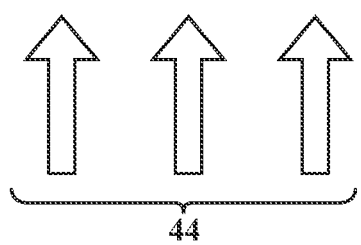

Referring to FIG. 2, a top view of the vertical axis turbine 10 of FIG. 1 is shown. Like before, like reference numerals have been used to refer to like components, and the description of these previous elements is equally applicable to this figure. Here, as wind 44 interacts with the vertical axis turbine 10, the vertical axis turbine 10 turns clockwise as indicated by arrows 50 and 52 when the locks 23A-23D and the lock 25 are unlocked.

As stated previously, the cords 32 and 34 regulate the position of the sails by regulating the position of the booms 24A-24D. Here, as the sail 26D interacts with the wind 44, the boom 24D will rotate from the position indicated by dotted lines 45 to its solid line drawn position on the outside of the frame. As the booms 24D, 24C, 24B, and 24A rotate about the central axis 14 (shown in FIG. 1), these booms will replicate the orientation of each boom whose position they fill. By so doing, the vertical axis turbine is more efficient than fixed sail or fixed blade vertical axis turbines, which do not move the position of the sails or blades.

Here, the cord 34 is pulled almost completely by the opposing sail 26D, such that the boom 24B is pointing directly into the wind 44. Similarly, as the sail 26B interacts with the wind 44, the flexible sail 26B will momentarily head the wind 44 and pause between both the inside and outside of the frame 12, as indicated by dotted lines 47. As the sail 26B passes across this point, the wind 44 gradually pushes the sail 26B from being substantially outside the frame 12 to substantially inside the frame 12, while the cord 34 gradually releases the sail 26B directly above and below the central portion 20 of the frame 12. Likewise, the wind shifts from billowing the sail 26B outside the frame 12 to pushing the sail 26B inside the frame 12.

As can be shown in FIG. 2, the sail attached to boom 24B is essentially in a position less likely to capture the wind 44, allowing it to more freely directly into the wind 44, but the sails attached to booms 24A, 24C, and especially 24D are in a position more capable of efficiently receiving the wind 44 in a manner that pushes them in an appropriate direction to rotate the frame 12. Sails 26A and 26C are harvesting a substantial portion of the wind 44 by their airfoil-like shape, which captures energy via Bernoulli's principle. By so doing, the vertical axis turbine 10 can be more efficient with receiving the wind 44 by maximizing the capture of the wind as the frame 12 rotates about the central axis 14, shown in FIG. 1.

Figure 3:
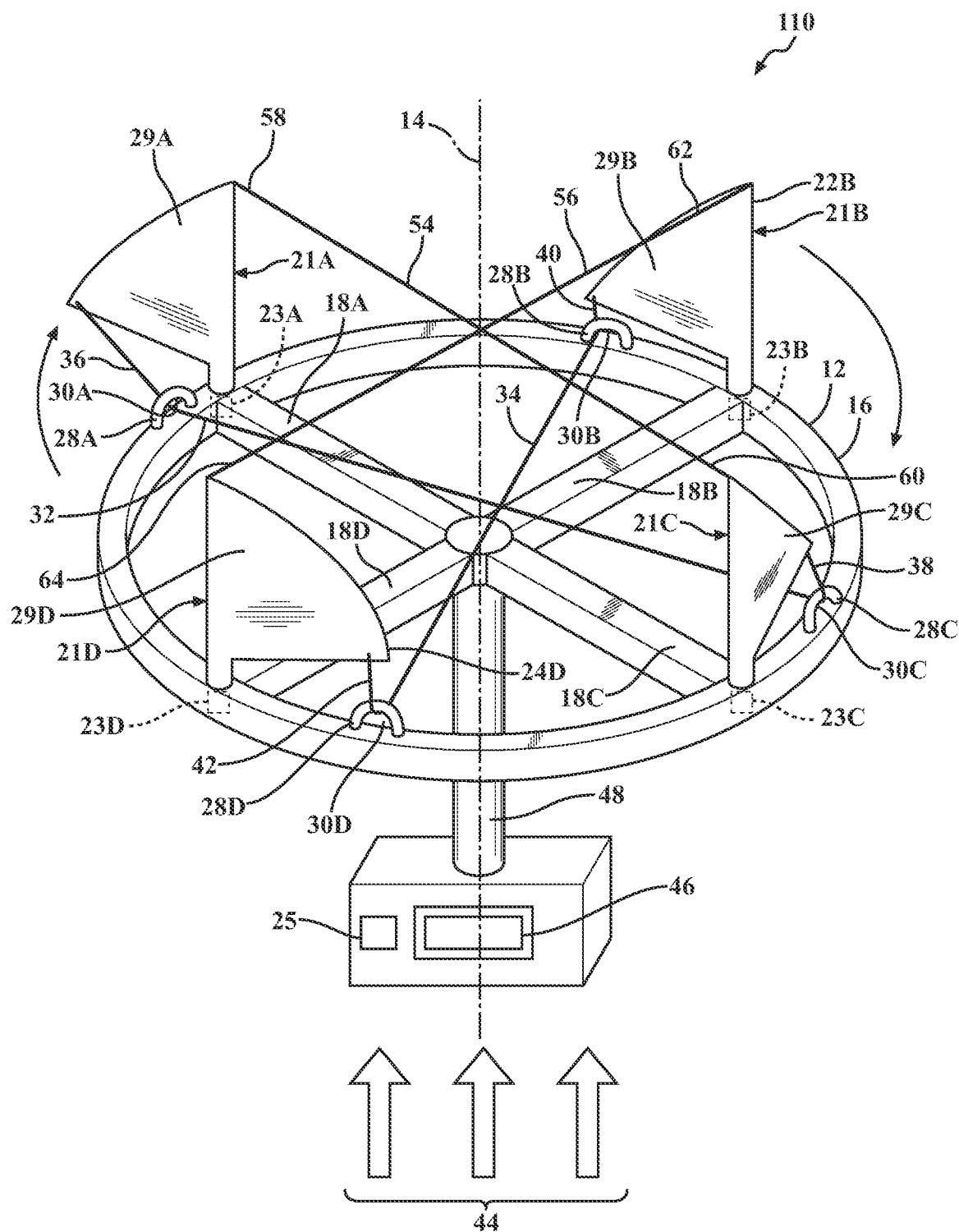
FIG. 3 illustrates another embodiment of the vertical axis turbine that utilizes blades.

Referring to FIG. 3, another embodiment of the vertical axis turbine 110 is shown. In this embodiment of the vertical axis turbine 110, similar reference numerals have been utilized to indicate similar elements previously described in FIG. 1. The description of these elements is applicable to this embodiment of the vertical axis wind turbine 110.

In this embodiment, the devices 21A-21D are comprised of blades. Like the previous embodiment and further embodiments discussed in this specification, the devices 21A-21D may replace the masts 22A-22D and/or booms 24A-24D and/or sails 26A-26D, or any combination thereof, with blades 29A-29D. The blades 29A-29D may be a single unitary structure, and they may be made out of a rigid or semi-rigid material. Further, while blades 29A-29D are shown to be substantially triangular, the blades 29A-29D may take any one of a different number of shapes, such as substantially quadrilateral. Each device 21A-21D may also comprise a plurality of separate blades. Also, like the vertical axis turbine 10 of FIG. 1, the device 21A-21D may also include locks 23A-23D that function to lock the blades 29A-29D into place. By so doing, the blades 29A-29D cannot rotate freely when the vertical axis turbine 10 is in a locked mode. Conversely, when the vertical axis turbine 10 is in an unlocked mode, the locks 23A-23D are unlocked and therefore allow the blades 29A-29D to rotate freely.

Additionally, the vertical axis turbine 110 differs from the vertical axis turbine 10 of FIG. 1 in that two additional cords 54 and 56 have been added. The cord 54 has a first end 58 and a second end 60. The first end 58 is attached to the top of the blade 29A, while the second end 60 is attached to the top of the blade 29C. Similarly, cord 56 has a first end 62 and a second end 64. The first end 62 is attached to blade 29B, while the second end 64 is attached to blade 29D. By attaching the cords 54 and 56 to their respective blades 29A-29D, the position of blades 29A-29D can be canted or tilted with respect to the frame 12 when the wind 44 is received by the vertical axis turbine 110. Further, it should be understood that the cords 54 and 56 can be attached in a different configuration, such as between devices 21A and 21D, 21B and 21C, 21C and 21D, 21A and 21B, or any other possible combination.

It should be noted that if cords 54 and 56 are substantially taut, such that all of the blades 29A-29D are tilted inward with respect to the central axis 14, the vertical axis turbine 110 can capture wind provided to it from any direction, essentially making the vertical axis turbine 110 omnidirectional. For example, wind originating below the vertical axis turbine 110 would cause the blades 29A-29D (or sails 26A-26D of FIGS. 1 and 2) to pivot outward to capture the wind energy coming from below the vertical axis turbine 110.

This wind energy will be captured in the same fashion as the sloped blades of a conventional horizontal axis wind turbine. All of the blades 29A-29D will be sloped at the same angle, allowing them to transfer the upward force of the wind into a constant horizontal force tangential to the frame 12 and thus produce torque. In like manner, a wind originating from above the vertical axis turbine 110 would cause the blades 29A-29D (or sails 26A-26D of FIGS. 1 and 2) to pivot inward to capture the wind energy coming from above the vertical axis turbine 110. Likewise, if the blades 29A-29D are tilted outward with respect to the central axis 14, then the wind turbine 110 will again be omnidirectional because the opposite will occur: the blades 29A-29D will pivot outward if a wind originates from above and inward if a wind originates from below.

Furthermore, as stated before, the blades 29A-29D may be replaced with masts 22A-22D, booms 24A-24D, and sails 26A-26D, as shown in FIG. 1. In this configuration, the first end 58 of cord 54 is connected to the top of mast 22A, while the first end 60 of the cord 54 is connected to mast 22C. Likewise, the first end 62 of the second cord 56 is connected to the top of mast 22B, while the second end 64 of the second cord 56 is connected to the top of mast 22D

However, the cords 54 and 56 could be attached differently to maintain the position of the masts 22A-22D or blades 29A-29D. For example, cord 54 could have a first end 58 attached to the top of the mast 22A, while the second end 60 of cord 54 could be attached to either mast 22B and/or mast 22C.

Figure 4:
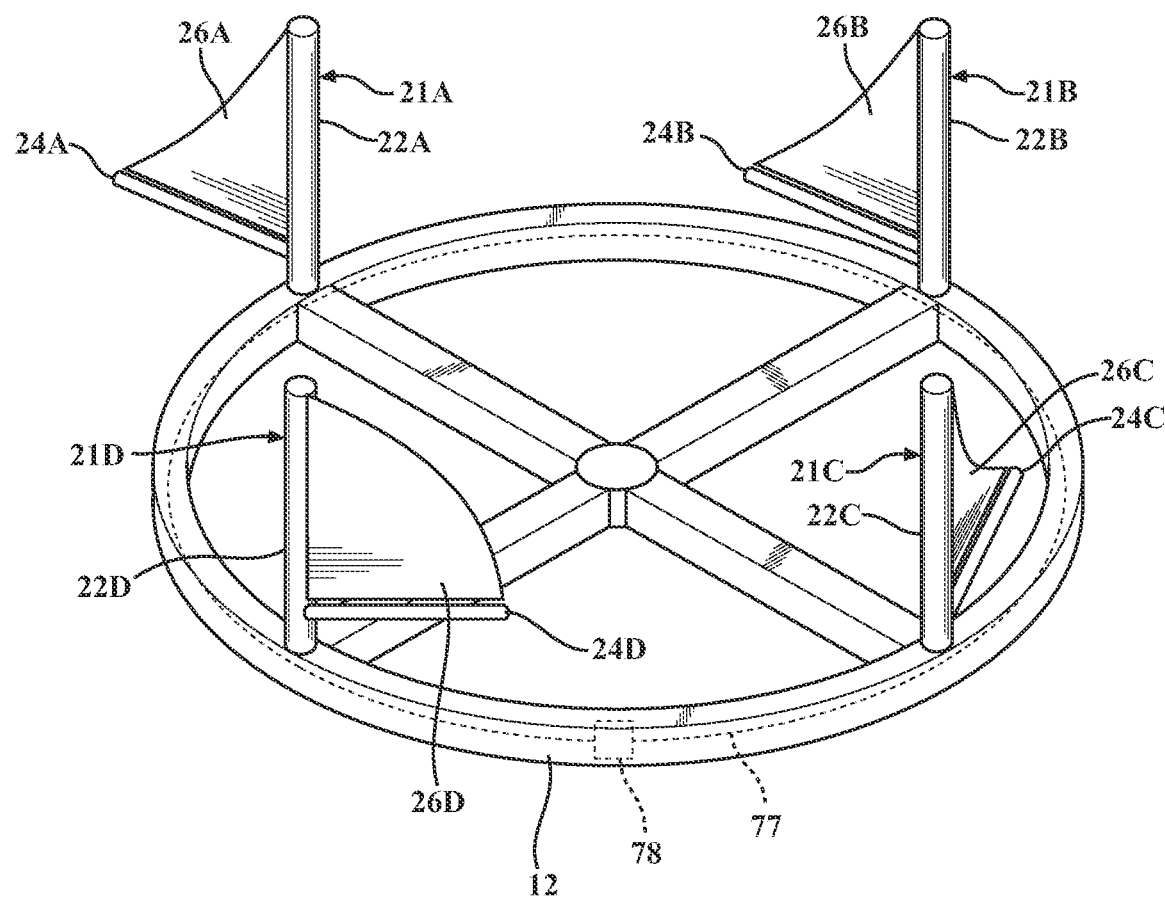
FIG. 4 illustrates a vertical axis turbine that utilizes a mechanical member embedded into the frame of the vertical axis turbine.

Referring to FIG. 4, another embodiment of the frame 12 having devices 21A-21D is shown. In this embodiment, a mechanical member 77 is situated within the frame 12 and configured to interact with each device 21A-21D. In this example, the devices 21A-21D are similar to the devices shown in FIG. 1, when the devices include masts 22A-22D, sails 26A-26D, and booms 24A-24D. However, it should be understood that the features of this embodiment are equally applicable in situations where the devices 21A-21D include blades, such as the blades 29A-29D shown in FIG. 3.

The movement of one of the devices 21A-21D causes the mechanical member 77 to move the other devices 21A-21D. As such, in this example, the mechanical member 77 is used in lieu of the cord 54 to regulate the movement of the devices 21A-21D. In one example, the mechanical member 77 may be a rope or chain that interacts with a gear of each of the devices 21A-21D. The movement of the mechanical member 77 causes a rotation of the gear of each of the devices 21A-21D, thus causing the devices 21A-21D to move. If the mechanical member 77 is locked into place, the movement of the devices 21A-21D is restricted and is fixed. As such, the mechanical member 77 may be in communication with a lock 78 that can lock and prevent the movement of the mechanical member 77 and therefore prevent the movement of the devices 21A-21D. The lock 78 can be any type of lock that can prevent the movement of the mechanical member 77, such as a pin lock, frictional lock, electric motor, and the like.

Figure 5:
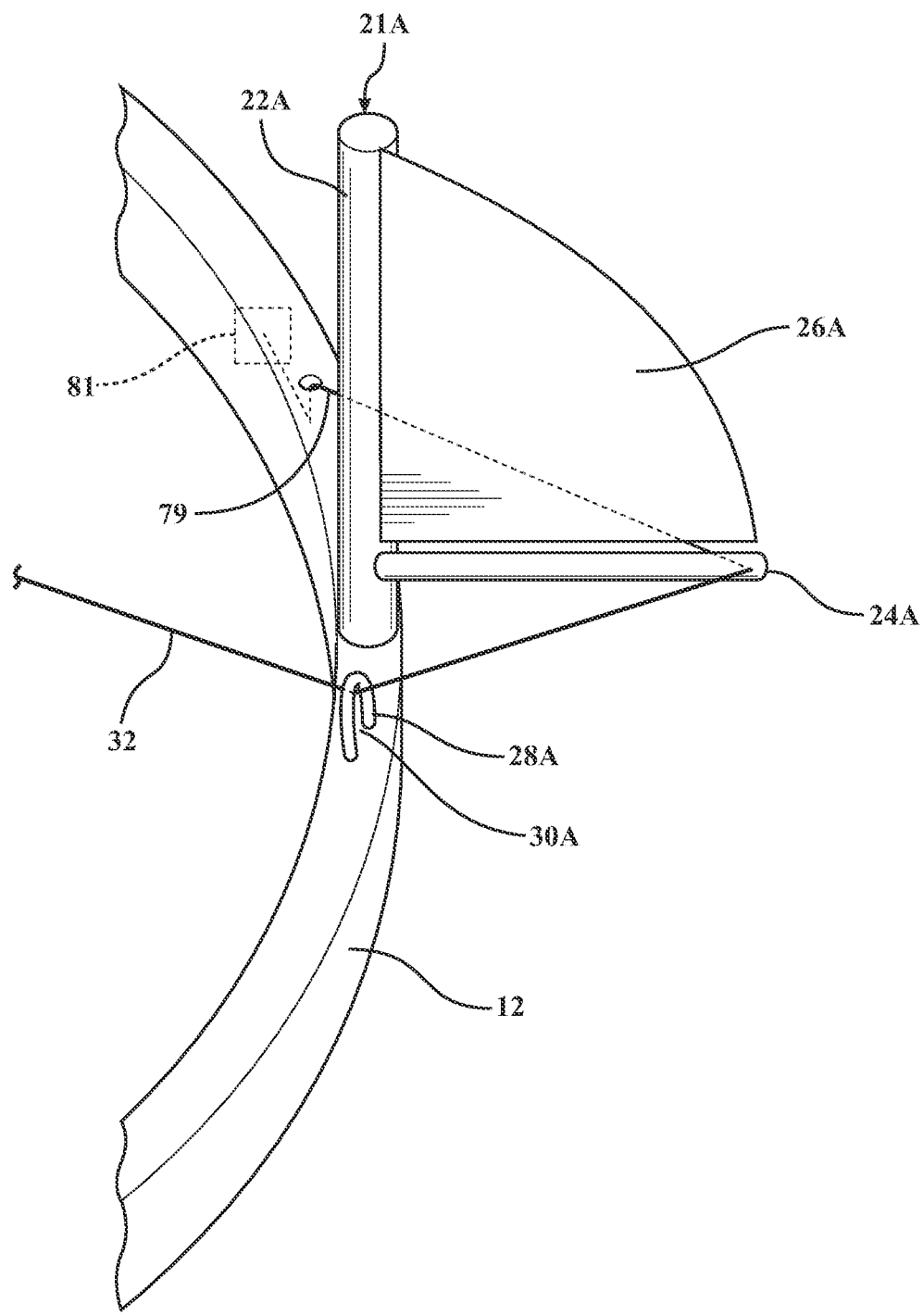
FIG. 5 illustrates an example of using an additional cord to regulate the movement and position of the boom and/or blades of the vertical axis turbine.

FIG. 5 illustrates another example of regulating the movement of the devices 21A-21D. In this example, the devices 21A-21D are similar to the devices shown in FIG. 1, which include masts 22A-22D, sails 26A-26D, and booms 24A-24D. However, it should be understood that the features of this embodiment are equally applicable in situations where the devices 21A-21D include blades, such as the blades 29A-29D shown in FIG. 2.

Here, like before, the position of the boom 24A is regulated by the cord 32. However, when in a locked mode, the cord 32 may be pulled taught to prevent the movement of the boom 24A in one direction. Another cord 79 may be connected to a mechanical lock 81 that can retract and lock the cord 79 in place. The mechanical lock 81 can be any type of suitable locking device, such as a pin, frictional lock, and the like. By so doing, the position of the boom 24A and, therefore, the sail 26A can be put into a specific position based on the length of the cords 32 and 79.

Figure 6:
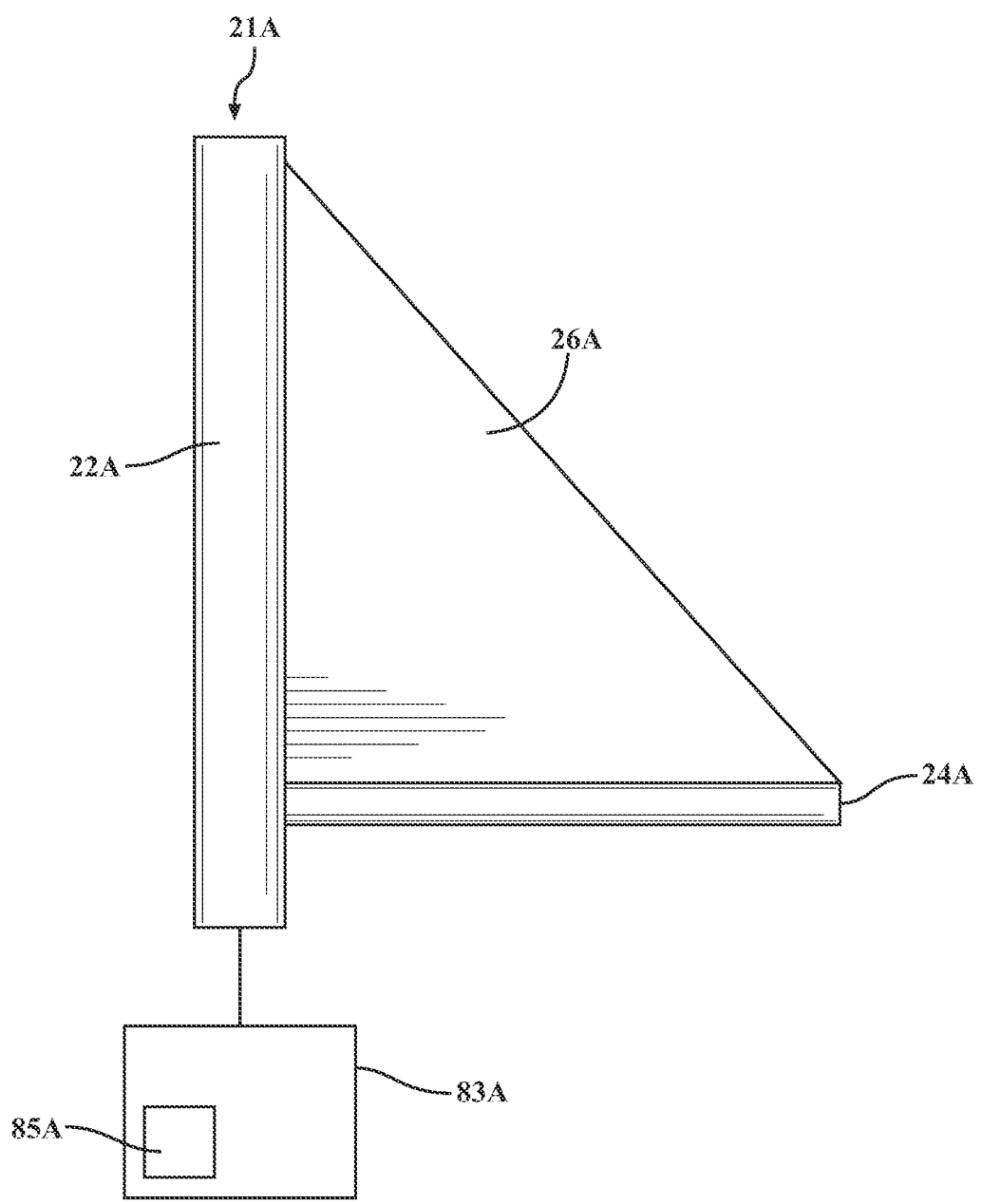
FIG. 6 illustrates an example of a vertical axis turbine that utilizes one or more motors to position the boom and/or blade of the vertical axis turbine.

FIG. 6 illustrates another embodiment of how to position the sail 26A of the device 21A. Like before, it should be understood that the features of this embodiment are equally applicable in situations where the devices 21A-21D include blades, such as the blades 29A-29D shown in FIG. 2.

Here, an electric motor 83A is in mechanical communication with the mast 22A. The boom 24A, in this example, may be fixed to the mast 22 A. As such, the rotation of the mast 22A by the electric motor 83A functions to move the boom 24A and, therefore, the position of the sail 26A. Alternatively, the electric motor 83A may be disposed of within the mast 22A and may cause the boom 24A to rotate about the mast 22A. A locking device 85A may be incorporated within the electric motor 83A and/or be located outside the electric motor 83A to be able to lock the position of the boom 24A into place when the vertical axis turbine is in a locked position. The locking device 85A can be any type of suitable locking device, such as a pin, frictional lock, and the like.

Figure 7:
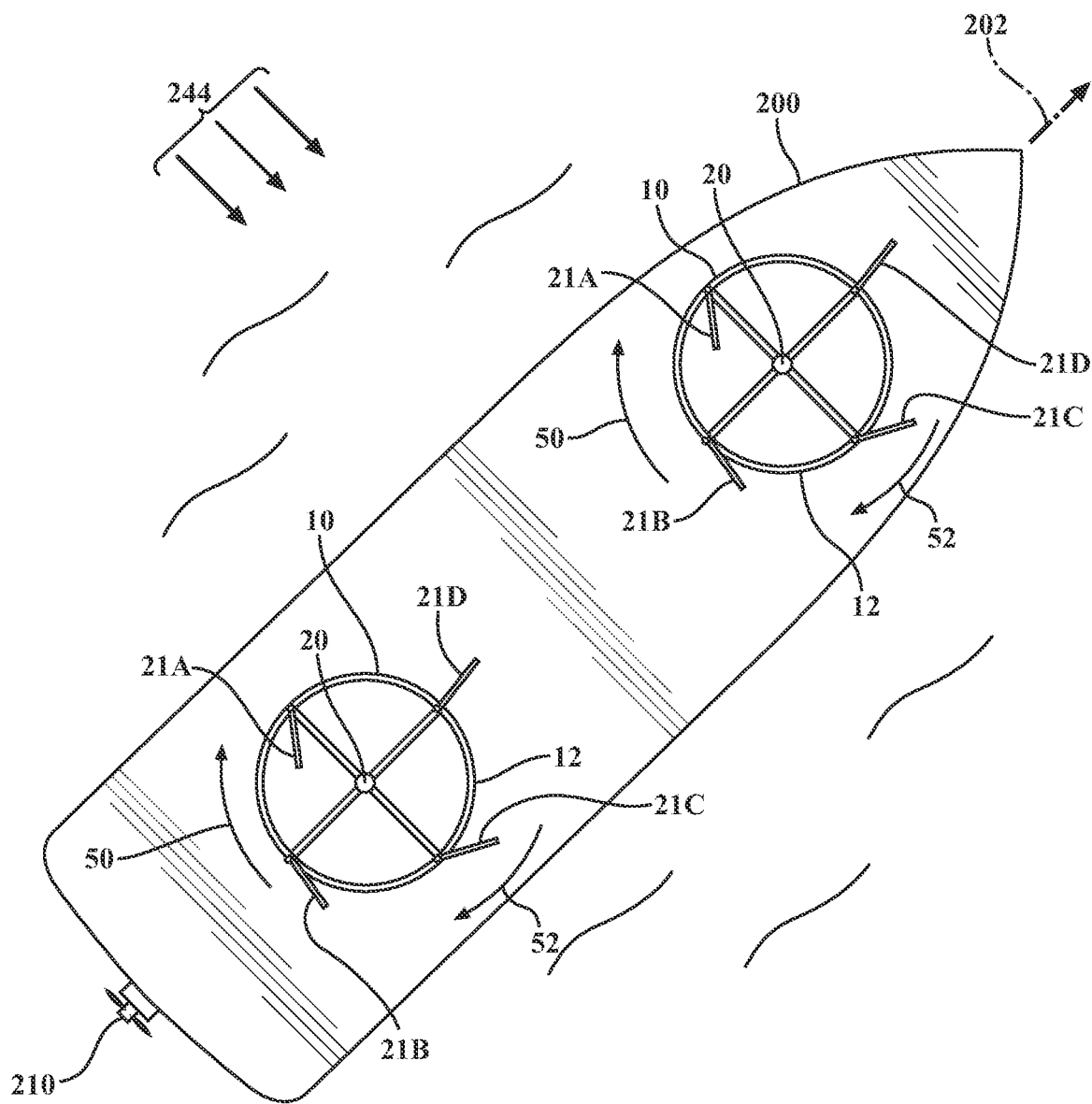
FIG. 7 illustrates a seagoing vessel incorporating the vertical axis turbine in an unlocked mode.

Referring to FIG. 7, an example of a seagoing vessel 200 incorporating two vertical axis turbines 10 is shown. In this example, the seagoing vessel 200 is traveling along a trajectory (direction) indicated by arrow 202. A wind 244 has a wind direction that is substantially perpendicular to the direction 202 of the seagoing vessel 200. In this example, as explained earlier in this description, the vertical axis turbines 10 rotate freely based on the interaction with the wind 244. In this example, the vertical axis turbines 10 are in an unlocked mode and therefore rotate freely. The rotation of the vertical axis turbines 10 can be used to convert energy from the wind 244 into either mechanical energy and/or electrical energy. The mechanical and/or electrical energy can then be used to drive a propeller 210 of the seagoing vessel 200 or, alternatively, could be used to provide electricity or mechanical power to any of a number of different systems and subsystems that form the seagoing vessel 200.

The seagoing vessel 200 can be any type of vessel capable of traversing water by flotation. As such, the seagoing vessel 200 can be a container ship, bulk carrier, barge, schooner, tanker, tugboat, frigate, passenger ship, and the like. In one example, the seagoing vessel 200 may also be a detachable "tugboat" for larger container ships, only attaching to the larger container ships once out at sea to preserve port operations of the existing container ships and providing additional thrust or auxiliary electrical power. This attachment could be via cables, magnetic clamps, or direct mechanical couplings.

Figure 8:
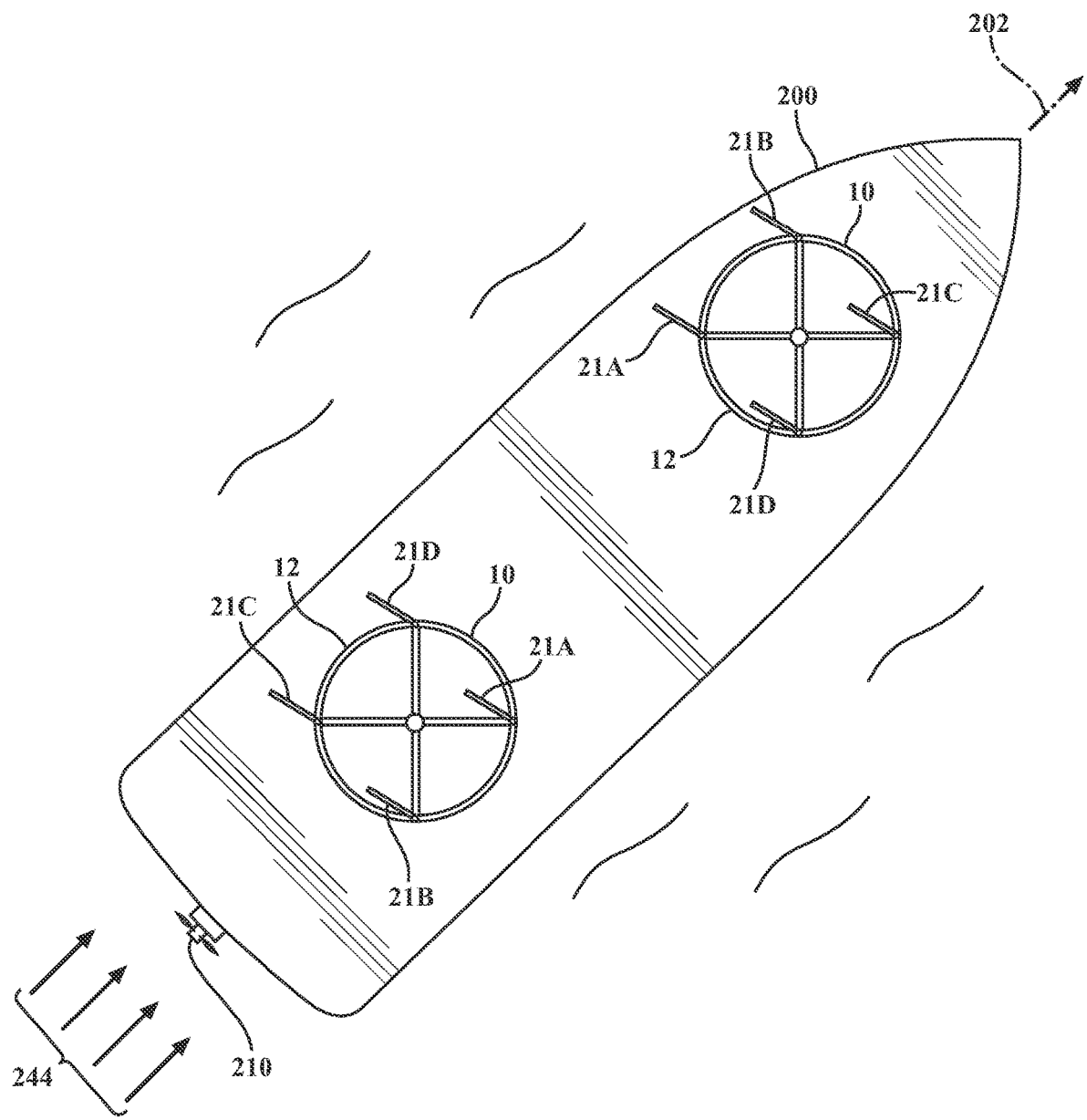
FIG. 8 illustrates the seagoing vessel of FIG. 7 incorporating the vertical axis turbine in a locked mode.

Referring to FIG. 8, the seagoing vessel 200 of FIG. 7 is shown. In this example, wind 244 has a wind direction similar to that of the direction 202 of the seagoing vessel 200. In this example, the vertical axis turbines 10 are placed in the locked position wherein the frames 12 of the vertical axis turbines 10 do not rotate. Furthermore, the devices 21A-21D are also locked in the place and do not rotate either. As such, if the devices 21A-21D utilize booms, masts, and sails, the booms are locked into place, strategically positioning the sails. If the devices 21A-21D are blades, the blades are locked in place.

In this example, it has been observed that the efficiency of propelling the seagoing vessel 200 forward can be improved by locking the vertical axis turbines 10 into place and using the devices 21A-21D to capture wind energy from the wind 244 and propel the seagoing vessel 200 along its direction 202 by transferring the forces captured from the wind 244 by the devices 21A-21D to the structure of the seagoing vessel 200. As such, in the locked mode, placement of the devices 21A-21D can essentially turn the seagoing vessel 200 into a sailboat, wherein at least a portion of the propulsion of the seagoing vessel 200 is provided by directly using energy from the wind 244 to propel the seagoing vessel 200 along the direction 202. It should be understood that the seagoing vessel 200 may also be propelled by the propeller 210 in addition to forces captured from the wind 244 by the locked vertical axis turbines 10.

It should be noted that the direction 202 that the seagoing vessel wishes to travel in the direction of the wind 244 plays a role in determining if the vertical axis turbines 10 should be placed in a locked or unlocked mode. For example, based on the direction of the wind 244 and the direction 202 of the seagoing vessel 200, one or more calculations can be performed as to what is more efficient—either capturing energy from the wind 244 by rotation of the vertical axis turbines 10 and using that energy to provide propulsion to the seagoing vessel 200 or, capturing energy to propel the seagoing vessel 200 by locking the vertical axis turbines 10 and providing propulsion to the seagoing vessel 200 by converting forces received from the wind 244 that are transferred down into the structure of the seagoing vessel 200, therefore, propelling the seagoing vessel 200 forward, similar to a sailboat.

Figure 9:
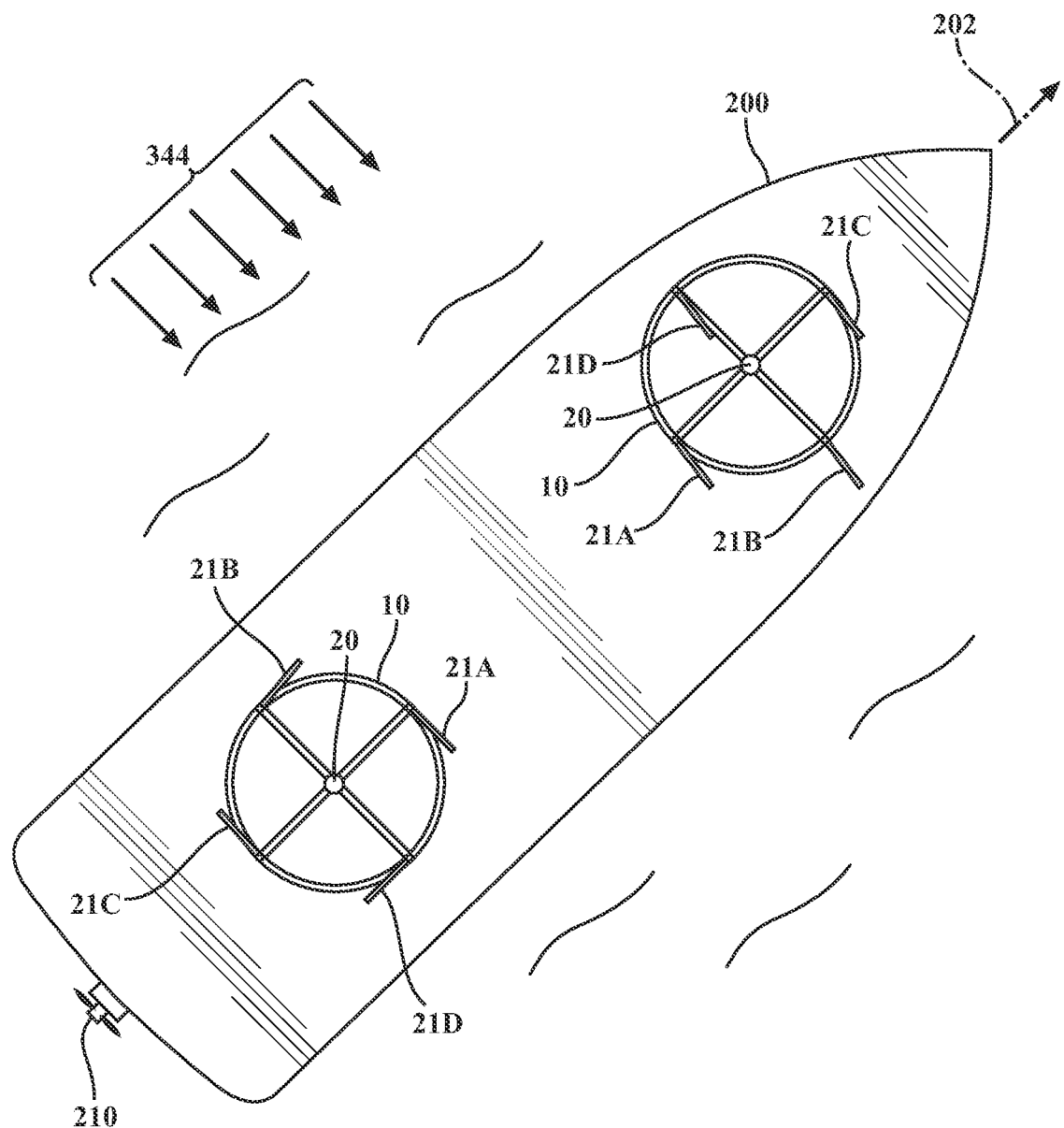
FIG. 9 illustrates the seagoing vessel of FIG. 7 incorporating the vertical axis turbine in a locked mode when the seagoing vessel experiences adverse weather conditions, such as hurricane force winds.

FIG. 9 illustrates one example of the seagoing vessel 200, including the vertical axis turbines 10. In this example, the seagoing vessel 200 is experiencing significant wind 344, which may be hurricane-like winds. To prevent damage to the vertical axis turbines 10, the devices 21A-21D may be rotated into one of two configurations. Moreover, in one configuration, the devices 21A-21D may be rotated to cut directly into the wind, as shown in the vertical axis turbine 10 on the upper right. In another configuration shown in the vertical axis turbine 10 on the lower left, the devices 21A-21D may be in a closed configuration, wherein the devices 21A-21D essentially guide the wind 344 around the exterior of the frame 12 of the vertical axis turbines 10.

Figure 10:
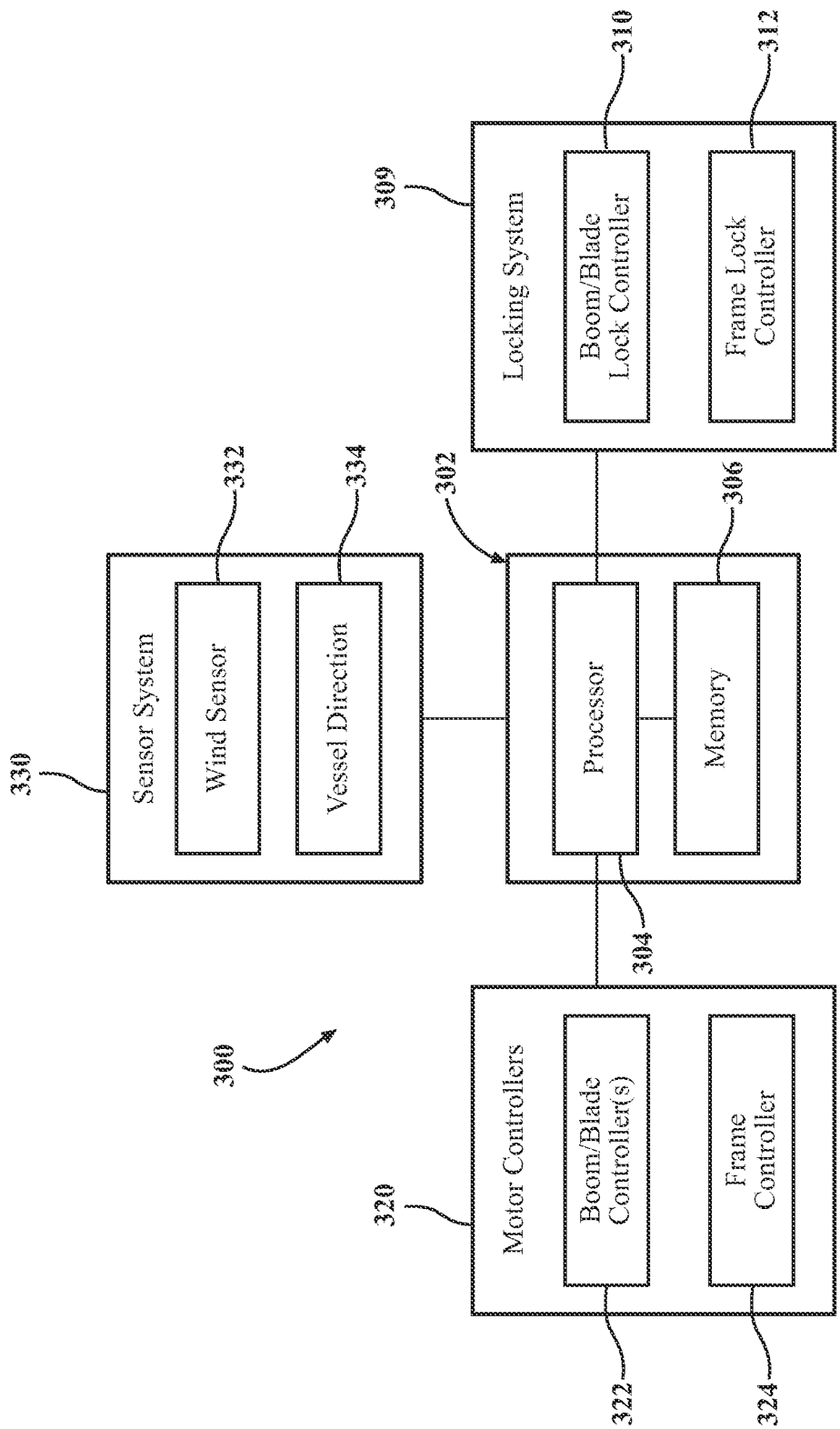
FIG. 10 illustrates a control system for the vertical axis turbine.

Referring to FIG. 10, a control system 300 for the seagoing vessel propulsion systems described in the previous paragraphs and figures is shown. In this example, the control system 300 includes a control module 302 that may include a processor 304 and a memory 306. The processor 304 may be a single processor or may be multiple processors acting in concert. The memory 306 may be any type of memory device capable of storing electronic information. As such, the memory 306 may be a solid-state memory device, a magnetic memory device, an optical memory device, and the like. The memory 306 may store instructions that cause the processor 304 to perform any one of the methods described in this specification.

The processor 304 is also in communication with the sensor system 330. The sensor system 330 may include a wind sensor 332 that can determine the speed and/or direction of wind received by the vertical axis turbines 10. The sensor system 330 may also have a vessel direction sensor 334, which indicates the direction of the seagoing vessel. It should be understood that the vessel direction sensor 334 may not be a sensor but may alternatively be a trajectory along a path that the seagoing vessel wishes to travel.

One or more motor controllers 320 may be in communication with the processor 304. For example, a boom/blade controller 322 may be in communication with the processor 304 that controls the position and movement of the boom/blade depending on the type of wind-capturing devices 21A-21D being utilized. The motor controllers 320 may also include a frame controller 324 that controls an electric motor that is in communication with the frame of the vertical axis turbine 10 and can, therefore, control the movement of the frame 12 of the vertical axis turbine 10.

A locking system 309 may also be in communication with the processor 304. The locking system 309 may include one or more boom/blade lock controllers 310 that cause the locking or unlocking of one or more locks, such as locks 23A-23D that allow the boom and/or blade to rotate freely in the unlocked mode but restrict the rotation in the locked mode. The locking system 309 may also include a frame lock controller 312 that controls the locking of the lock 25 of the frame 12 of the vertical axis turbines 10.

As stated before, the memory 306 may include any one of a number of different instructions that cause the processor 304 to perform any of the methods disclosed in this specification. In one example, the memory 306 includes instructions that, when executed by the processor 304, cause the processor 304 to determine the wind direction of any wind received by the seagoing vessel by monitoring the wind sensor 332 in determining the direction of the seagoing vessel by receiving information for the vessel direction sensor 334. Based on the analysis of the wind direction and speed in the direction of the seagoing vessel, the processor 304 may determine regarding if the vertical axis turbine 10 should be in a locked or unlocked mode. For example, if the wind direction of the wind in the direction of the seagoing vessel or substantially similar, the processor 304 may determine that it is more efficient to place the vertical axis turbine 10 in a locked mode. Conversely, if it is determined that the direction of the wind interacting with the seagoing vessel is substantially perpendicular to the direction of the seagoing vessel, the processor 304 may determine that the vertical axis turbine 10 should be in the unlocked mode to collect energy from the rotation of the frame of the vertical axis turbine 10.

It should be understood that a number of different calculations can be utilized by the processor 304 to determine what type of mode the vertical axis turbine 10 should be placed in. Furthermore, the processor 304 may receive information from the sensor system 330 that indicates that the seagoing vessel is traveling through adverse weather conditions that may include hurricane-force winds. If such a situation arises, the processor 304 instructs the motor controllers 322 to orientate the devices 21A-21D as previously described in the paragraphs above that refer to FIG. 9.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media and volatile media. Non-volatile media may include, for example, optical disks, magnetic disks, and so on. Volatile media may include, for example, semiconductor memories, dynamic memory, and so on. Examples of such a computer-readable medium may include but are not limited to a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof.

Accordingly, reference should be made to the following claims rather than to the foregoing specification, as indicating the scope hereof.

What is claimed is:

1. A propulsion system for a seagoing vessel, the propulsion system comprising:
a vertical axis wind turbine having a locked mode and an unlocked mode, the vertical axis wind turbine having:
a frame having that is rotatable about a central axis when in the unlocked mode and non-rotatable about the central axis when in the locked mode,
either (a) at least two masts coupled to the frame, each having a sail and a boom that is rotatable when in the unlocked mode and non-rotatable when in the locked mode, or (b) at least two blades coupled to the frame, the at least two blades when in the unlocked mode and non-rotatable in the locked mode, and
a mechanical member having a first portion coupled to the boom of one of the at least two masts and a second portion coupled to the boom of the other of the at least two masts or having the first portion of the mechanical member coupled to one blade of the at least two blades and the second portion of the mechanical member coupled to the other blade of the at least two blades, the mechanical member being configured to regulate positions of the two sails or two blades when in the unlocked mode; and
a control system configured to selectively change the vertical axis wind turbine between the locked mode and the unlocked mode.

2. The propulsion system of claim 1, further comprising:
a wind direction sensor in communication with the control system, the wind direction sensor is configured to determine a direction of a wind that is received by either one of the sail or a blade of at least two blades; and
wherein the control system is configured to determine when the vertical axis wind turbine should be in either the locked mode or the unlocked mode based on the direction of the wind and a direction that the seagoing vessel is traveling.

3. The propulsion system of claim 2, wherein the control system is configured to determine that the vertical axis wind turbine should be in the locked mode when the direction of the wind is substantially similar to the direction that the seagoing vessel is traveling.

4. The propulsion system of claim 2, wherein the control system is configured to determine that the vertical axis wind turbine should be in the unlocked mode when the direction of the wind is dissimilar to the direction that the seagoing vessel is traveling.

5. The propulsion system of claim 2, further comprising a propeller for providing propeller propulsion to move the seagoing vessel, the propeller propulsion being generated at least in part by a rotation of the frame about the central axis.

6. The propulsion system of claim 5, wherein the control system is configured to determine that the vertical axis wind turbine should be in the locked mode when propeller propulsion is less than propulsion provided by the sails or by the at least two blades by the wind received by the sail or the at least two blades when in the locked mode.

7. The propulsion system of claim 5, wherein the frame is in mechanical communication with the propeller.

8. The propulsion system of claim 5, wherein the frame is in mechanical communication with an electrical generator.

9. The propulsion system of claim 2, further comprising each boom is coupled to a boom motor or each blade coupled to a blade motor, wherein each boom motor is configured to change a rotational position of the respective boom, and each blade motor is configured to change the rotational position of the respective blade.

10. The propulsion system of claim 9, wherein the control system is in communication with the boom motor or the blade motor.

11. The propulsion system of claim 10, wherein the control system is configured to change the rotational positions of the booms or blades based on the direction of the wind that is received by either the sails or the blades.

* * * * *